United States Patent [19]

Braeutigam

[11] Patent Number: 5,352,610
[45] Date of Patent: Oct. 4, 1994

[54] TUBULAR MEMBRANE ASSEMBLY

[76] Inventor: Hans-Juergen Braeutigam, Marmstorferweg 74, DE-2100 Hamburg 90, Fed. Rep. of Germany

[21] Appl. No.: 800,479

[22] Filed: Dec. 3, 1991

Related U.S. Application Data

[63] Continuation-in-part of Ser. No. 466,344, Mar. 22, 1990, abandoned.

[30] Foreign Application Priority Data

Dec. 3, 1990 [DE] Fed. Rep. of Germany ....... 4038514

[51] Int. Cl.$^5$ .................... C12M 3/06; B01D 63/06
[52] U.S. Cl. .................... 435/284; 435/313; 95/6; 95/10; 95/11; 210/321.78; 210/321.87
[58] Field of Search .................... 55/16, 158; 422/139, 422/133, 140; 435/288, 818, 313, 314, 284, 286; 210/321.87, 321.83, 321.74, 321.75, 321.78, 321.84, 321.86, 321.87; 95/6, 10, 11

[56] References Cited

U.S. PATENT DOCUMENTS

| | | | |
|---|---|---|---|
| 1,431,716 | 10/1922 | Arens | 264/250 |
| 2,686,936 | 8/1954 | Tuckerman et al. | 264/163 |
| 2,859,151 | 11/1958 | Usab et al. | 264/258 |
| 4,196,027 | 4/1980 | Walker et al. | 210/498 |
| 4,416,993 | 11/1983 | McKeown | 435/313 |
| 4,649,114 | 3/1987 | Miltenburger et al. | 435/240 |
| 4,652,373 | 3/1987 | Trimmer | 210/450 |
| 4,781,834 | 11/1988 | Sekino et al. | 210/321.88 |
| 5,106,579 | 4/1992 | Fukazawa et al. | 96/10 |

FOREIGN PATENT DOCUMENTS 2940446  4/1981  Fed. Rep. of Germany.
3122186 12/1982  Fed. Rep. of Germany.
3544382  6/1987  Fed. Rep. of Germany.

Primary Examiner—Robert J. Warden
Assistant Examiner—Theresa A. Trembley
Attorney, Agent, or Firm—Sixbey, Friedman, Leedom & Ferguson

[57] ABSTRACT

The invention relates to a reactor in which the gas is introduced by a gas feed pipe by at least one tube membrane. The tube membrane consists of a hollow cylinder with perforations or of a metal fabric on which a silicone hose is placed. On the silicone hose there is a fabric reinforcement to which another silicone membrane or a silicone rubber layer is applied.

7 Claims, 3 Drawing Sheets

TUBULAR MEMBRANE ASSEMBLY

CROSS-REFERENCE TO RELATED APPLICATION

This application is a continuation-in-part of U.S. patent application, Ser. No. 07/466,344, filed Mar. 22, 1990, now abandoned.

BACKGROUND OF THE INVENTION

The invention relates to a reactor in which the gas is introduced by a gas feed pipe into a liquid by at least one generally cylindrical membrane, the specific design of the membrane and a process for its production.

DESCRIPTION OF RELATED ART

To perform gas exchange processes such as, e.g., the introduction of oxygen into culture media during fermentation, the use of membranes made of gas-permeable silicone rubber is known. The gas exchange occurs without bubbles as a result of solution and diffusion processes in the nonporous plastic material. The larger the membrane surface installed in the reactor and the larger the gas partial pressure difference between the phases adjacent to the membrane and the thinner the membrane, the higher the exchange rate. If liquid phases are involved, moreover, a good flow against the membrane surface is further to be sought. Because of the excellent gas permeability, silicone rubber is especially well suited compared to other polymer materials. It has already been proposed in DE-PS 29 40 446 to use thin-walled silicone hoses for supplying oxygen to cultures in fermenters. With a hose diameter of only about 5mm and a wall thickness of about 0.5mm, oxygen exchange rates of about 50mg of $O_2$/h per meter of hose can be achieved with these silicone hoses, since the silicone hoses exhibit a limited mechanical strength and can be stressed with excess pressures up to 1 bar maximum. Because of the limited mechanical strength of silicone hoses, the possibility of raising the pressure and increasing the diameter is limited, so that only relatively low oxygen exchange rates are possible with silicone hoses. To eliminate this drawback, according to DE-OS 31 22 186 it has already been proposed, for gassing and degassing liquids, to produce silicone membranes with support fabrics made of fine steel in which the support fabric is electrostatically coated with a polymer. The membrane thickness here is between 1 micron and 500 microns. In silicone membranes produced this way, the drawback is that, during the electrostatic coating, defects can occur that lead to inoperability of the membranes. A drawback in the production of silicone membranes for gas exchange processes by electrostatic coating of metallic support fabrics that are alternately singly or doubly woven in the warp and/or woof direction is the absolutely essential, cost-intensive preparation of the fabrics to achieve an evenly thin and perforation-free film. The difficulties associated with performing a defect-free, electrostatic coating have led to the fact that silicone membranes thus produced have not been able to gain acceptance.

In DE-OS 35 44 382 it has been proposed, as an alternative, to use silicone hoses that can be made, by a flexible fabric reinforcement, to be pressurized and thus make higher gas exchange rates possible. With oxygen, feed rates of 150mg of $O_2$/h per meter of hose was achieved with these hoses. Despite this, in processes with high reaction rates and in reactors with a volume of more than 50 liters, still large amounts of hose are needed whose installation in the reactor requires additional and technically expensive holding devices. Hose membranes with an outer diameter of about 5mm and a wall thickness of 0.5mm are now common. The fabric reinforcement is either on the hose outer wall or between two silicone hoses bonded to one another. The production of such reinforced silicone hoses always starts with an unreinforced, fully cured silicone hose. In the case of external reinforcement, the fabric sheath is applied according to known processes in a second work step. The hose variant with the integrated fabric reinforcement is obtained in that a silicone hose with an external sheath is conveyed in another operation through an extruder that sprays a silicone layer about 0.1mm to 0.2mm thick on the hose or fabric reinforcement. The sprayed-on silicone outer hose is then vulcanized in a known way. Such reinforced silicone hose membrane systems are distinguished from unreinforced membrane systems by higher gas exchange rates. In this way, to perform a specified exchange process, the necessary membrane surface is reduced, which saves costs. But if gas exchange processes with high reaction rates must be performed in large pieces of equipment, large amounts of hose are necessary, whose installation in the respective equipment requires additional, cost-increasing holding devices. For example, in a fermenter with a working volume of 1 $m^3$ for cultivating animal cell cultures with an oxygen requirement of 100 g $O_2$/h, 666 m of silicone hose must be installed. To reduce the hose length and thus the hose requirement and the technical expense, it is desirable to use hose membranes with a larger outer diameter and thus a higher specific gas feed performance. But the production of such silicone hoses with an outer diameter of, e.g., 20 mm and greater is technically possible only if, at the same time, the wall thickness of the silicone hose on which the fabric reinforcement must be applied is increased to about 2 mm and 3 mm. But such thick-walled silicone hoses make possible only low gas exchange rates and are thus not of interest for technical application. Further, because of the required large amounts of silicone rubber, such silicone hoses would cause considerable hose costs. Further it is desirable to dispense with holding and support devices. On the one hand, disruptive deposits could form here, on the other hand, the vulnerability to trouble increases since, in case of pressurization, the hose membrane can be damaged at the points of support.

To increase the gas concentration in water it is further known to convey the latter first downward and then again upward in a closed U-shaped tube and to feed in gas, such as, e.g., oxygen, air or the like. This gas is to go in solution in the water. The gas-enriched water is then fed to downstream reactors in which biological or physiochemical reactions are performed. For economical gas enrichment the water stream and the amount of gas blown in have to be matched to one another, so that the gas bubbles produced as much as possible float in the water stream and no hydraulic breakdowns occur by rising bubbles or no gas losses develop by sinking bubbles. Maintaining this delicate balance led to technically expensive reactor designs and gas recirculation with the help of pumps.

SUMMARY OF THE INVENTION

The object of the invention is to improve the reactor of the initially mentioned type so that the operational reliability is increased and in addition biological and physiochemical reactions can also be performed with the gas dissolved in the water. Further, the reactor is to have a compact design with greater productivity and comprise tube membranes for this purpose, with thin-walled construction, exhibit a considerably larger diameter than known silicone hoses and are so dimensionally stable that, when used also in large fermenters, they require no support and holding devices.

The above objects are achieved via a silicone rubber, tube membrane assembly and a process for the production of such an assembly in accordance with the present invention. More specifically, the membrane assembly, for gas exchange in a liquid for working of biotechnological processes, has a generally cylindrical configuration in which a perforated, dimensionally stable, hollow, metal or plastic, cylinder has a fiber-reinforced silicone membrane mounted on it and the membrane is surrounded by an adjacent fabric reinforcement. In accordance with the process of the invention, the membrane is applied to a perforated wall of the hollow cylinder either by stretching a tubular membrane by a partial vacuum, inserting the cylinder and releasing the vacuum to shrink the tubular membrane onto the cylinder, or by winding a flat membrane around the cylinder wall. In either case, a fabric reinforcement is then applied onto the silicone membrane, after which the fabric reinforcement is covered with a silicone rubber layer.

According to the invention, e.g., a reactor through which flow is vertically downward and which is filled with water, is formed in which there are solid particles which move freely floating because of their lesser density compared to water and the water stream. The gas to be dissolved can be blown in at any point of the reactor and the fluidized bed formed from the particles. By the intensive contact with the particles the retention times of the bubbles in the reactor is greatly increased and the mass transfer rate is correspondingly raised. The intensive particle movements in the intake area, which disperse the gas bubbles and prevent their recombination also have an advantageous effect.

The gas feed takes place by gas-permeable tube membranes made of silicone rubber. In addition, an injection of gas can be performed. It is of special advantage that the combination of the membranes with the process according to the invention for the first time offers the possibility fully to exhaust the performance potential of membrane gassing since the initial effects, undesirable per se (M.-J. Braeutigam dissertation, 1985, TUHH), at high pressures are not disruptive but can be used very advantageously here to increase the concentration of the outflow.

The reactor according to the invention is also suitable for performing a process for an efficient discharge of undesired dissolved gases, such as, e.g., carbon dioxide, nitrogen and the like. For this purpose the gas feed only has to be increased enough so that the absorptive capacity of the water is exceeded. The excess gas, in which the desired component is enriched, is removed from the reactor by the hydrostatic pressure from the upper part of the reactor in which an outlet opening, such as a cock or a valve, is installed. In using gas-permeable membranes for the controlled discharge it is advantageous that the intensive movement of particles prevents performance-reducing deposits on the membrane surface.

With a reactor according to the invention biological or physiochemical reactions can additionally be performed. In this case the surface of the particles is covered with the corresponding microorganisms (nitrifying bacteria, denitrifying bacteria, acetic acid bacteria, etc. . . .) or catalysts which either settle by themselves or are artificially plated.

According to the invention, dimensionally stable or optionally prefabricated hollow cylinders made of metal, metal fabric, sheet metal or plastics with holes or other perforations in the wall are used on which the actual thin and gas-permeable silicone rubber membrane is applied as a sheet. The sheet can be produced directly on the hollow cylinder by conventional dipping or extrusion processes with subsequent vulcanization. Also possible is the use of commercially available, reinforced or unreinforced flat membranes made of silicone rubber that are placed around the hollow cylinder and bonded to one another along the lengthwise seam. It can also be advantageous to use prefabricated, thin-walled silicone hoses that are pulled over the hollow cylinder. As dimensionally stable hollow cylinders, smooth tubes with at least one perforation in the tube wall are also suitable. In this case there must be inserted, between tube outer wall and silicone membrane inner side, a netting or fabric as a spacer that guarantees an even distribution of the gas flowing out of the tube through at least the one perforation to the silicone membrane.

In tube membranes that exhibit a silicone film vulcanized on the hollow cylinder, the silicone rubber closes the holes of the cylinder wall. Essential to the invention to achieve good gas permeabilities is the use of materials with a thickness between 0.05mm and 1 mm for the cylinder wall. Here it is advantageous to use metal sheets with round, angular or elongated openings with a size of 1 mm to 3 mm or metal fabrics with mesh sizes between 0.05 mm and 2 mm. The sum of the perforation cross sections advantageously amounts to 20% to 70% of the cylinder wall surface. As starting components, conventional silicone rubber mixtures can be used that optionally also contain additives that improve the adhesion of the silicone film on the material of the hollow cylinder. The adjustment of the viscosity is performed according to the specifications of the respective manufacturer and if necessary can be additionally diluted with solvents.

According to the invention, silicone rubber tube membranes are obtained moreover when thin-walled silicone hose with a thickness of, e.g., 0.2 mm, is applied to the hollow cylinder or is put against the hollow cylinder inside wall. In the latter case it is advantageous to bond the silicone hose to the cylinder wall, and commercially available silicone adhesives can be used. To achieve high gas feed rates with the help of high internal pressures, a fabric reinforcement known in the art can be applied as the pressure bearer to the gas-permeable silicone membrane. It is further advantageous to apply a second thin silicone membrane to the fabric reinforcement. This second silicone membrane has the object of preventing deposits in the fabric reinforcement and to make an optionally necessary cleaning of the tube membrane easier. For further improvement of the pressure loading capacity, it is further possible to bond the silicone membranes, fabric sheaths, spacers and hollow cylinders to one another by suitable silicone adhesives. The gas feed occurs at the ends of the tube membrane by suitably adapted connecting pieces.

The advantages of the tube membrane according to the invention made of perforated sheet metal, metal fabric or perforated plastic with silicone coating or with silicone hose bonded on the outside or inside are evident as shown by the example of a silicone-coated tube membrane made of metal fabric (mesh size 0.4 mm) with a length of 1,000 mm and an outer diameter of 30 mm. To the tube-shaped support element, a 0.2 mm-thick silicone membrane was applied and provided with a fabric sheath to which another 0.2 mm-thick protective silicone rubber sheath was applied. Because of the specific $O_2$ permeability of such a tube membrane of 1,000 mg $O_2$ per tube and hour at an oxygen partial pressure of 5 bars in the tube interior, only about 50 tubes with a length of 2 m are needed, instead of the otherwise necessary 666 m of reinforced silicone hose, for the oxygen supply of a technical fermenter with a 1 $m^3$ working volume.

The circular orientation of these tubes parallel to the lengthwise axis of the reactor is advantageous. The arrangement can be made in several concentric circles. The tubes are connected above and below to circular rings and can be supplied with gas by them. If the tube membranes are to be placed parallel, it is advantageous to produce the circular rings from tubing. The gas, e.g., oxygen, is fed by one tube and an undesired gas, e.g., carbon dioxide, is removed by the other. Likewise, attachment of the tube membranes to a central conduit tube is possible. The tube membranes can be placed parallel as well as behind one another. The gas fed into an external liquid circuit of a reactor is also possible. In another application of the silicone tube membranes according to the invention, two tube membranes can be assembled into a tube flat membrane active on both sides. For this purpose, two tube membranes according to the invention of differing diameters are placed inside one another and are connected gastight to one another on the front end and provided with the necessary gas feed or discharge pipes.

BRIEF DESCRIPTION OF THE DRAWINGS

In the drawings, examples for the design and arrangement of tube membranes according to the invention are represented that are explained in more detail below. There are shown in.

DETAILED DESCRIPTION OF THE PREFERRED EMBODIMENTS

Figure 1:
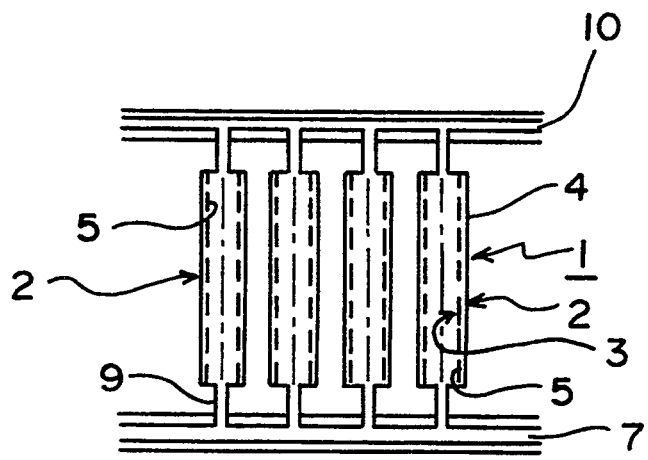
FIG. 1, the design of tube membranes placed parallel to one another in a diagrammatic side view, FIG. 2, the arrangement of tube membranes in a series, FIG. 3, the design of double-walled tube membranes in a diagrammatic side view, FIGS. 4 and 5, the design of another tube membrane in a side view in section and in a top view.

In the arrangement according to FIG. 1 different tube membranes 1 are placed parallel to one another. Each tube membrane 1 consists of a hollow cylinder 2 in whose hollow cylinder wall 5 perforations 3 are made. On the outer surface of hollow cylinder wall 5, there is a silicone rubber layer 4. Each tube membrane 1 is connected by connecting pipes 9 to a gas supply pipe 7 and a gas discharge pipe 10. Hollow cylinders 2 of tube membrane 1 can consist of perforated sheet metal or of metal fabric.

Figure 2:
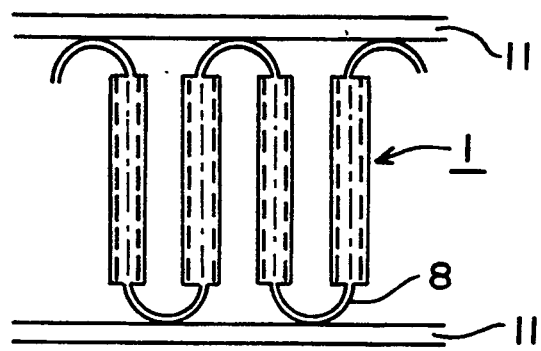

In the arrangement represented diagrammatically in FIG. 2, tube membranes 1 are in a series arrangement between container walls 11 of, e.g., a fermenter. Tube membranes 1 are designed as described in FIG. 1. The connection of tube membranes 1 to one another is performed by connecting pipes 8.

Figure 3:
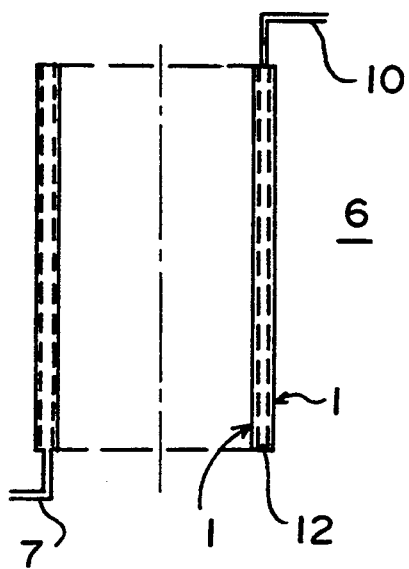

FIG. 3 diagrammatically represents a gas exchanger 6 that consists of two tube membranes 1 pushed coaxially into one another. Between tube membranes 1 there is a circular chamber 12 that is connected to a gas supply pipe 7 and a gas discharge pipe 10. By this gas exchanger, it is thus possible to introduce gas on both sides of tube membranes 1 into the surrounding liquid. It is also possible to form a structurally compact and efficient gas exchanger by producing a series of gas exchangers 6 of different outer diameters selected so that they can be nested together, one within another.

Figure 4:
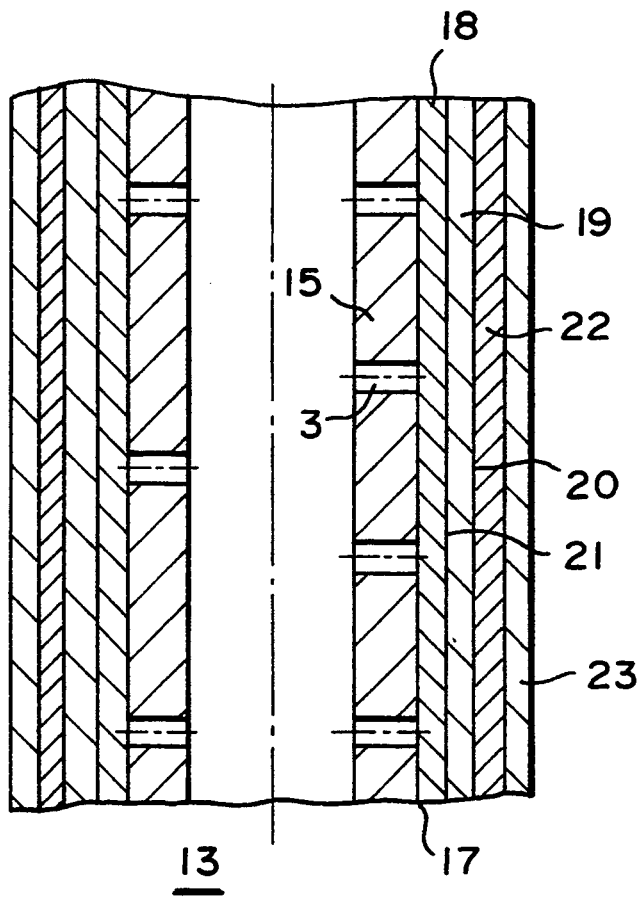
Figure 5:
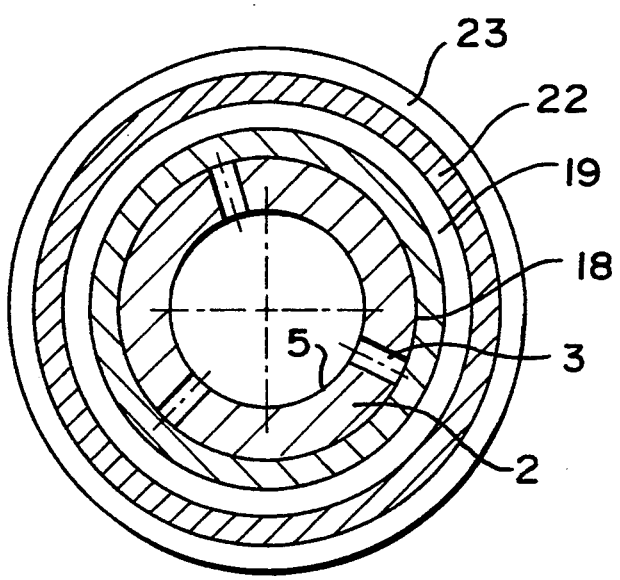

Tube membrane 13 represented in FIGS. 4 and 5 exhibits, as a support element, a central hollow cylinder 2 whose diameter can be larger than 15 mm. Perforations 3 are made in cylinder sheath 15. A gas-permeable spacer 18 is placed on outer surface 17 of hollow cylinder 2. To spacer 18 there is applied a silicone membrane 19 that is braced with its inner surface 21 on spacer 18. The wall thickness of silicone membrane 19 can be smaller than 0.5 mm. On outer surface 20 of silicone membrane 19 there is placed a fabric reinforcement 22. The latter is covered by another silicone membrane 23. Instead of silicone membrane 23, a silicone rubber layer 4 can be applied. The purpose of silicone membrane 23 or silicone rubber layer 4 is to prevent a contamination of fabric reinforcement 23 that would impair the gas exchange capability of tube membrane 13. Instead of a hollow cylinder, a wire tube can also be used as a support element. In the latter case, no spacer 18 would be necessary. Tube membrane 13 described can be produced in lengths greater than 0.3 m.

Tube membranes 1, 13 are suitable for gas exchange processes in containers whose container volume is greater than 0.05 $m^3$. Here the process can performed so that an aqueous liquid is in hollow cylinder 2 and a gas or a gas mixture is between container wall 11 and hollow cylinder wall 5. It is also possible to introduce a gas or gas mixture into hollow cylinder 20 and then an aqueous liquid can be located between container wall 11 and hollow cylinder wall 5.

Figure 6:
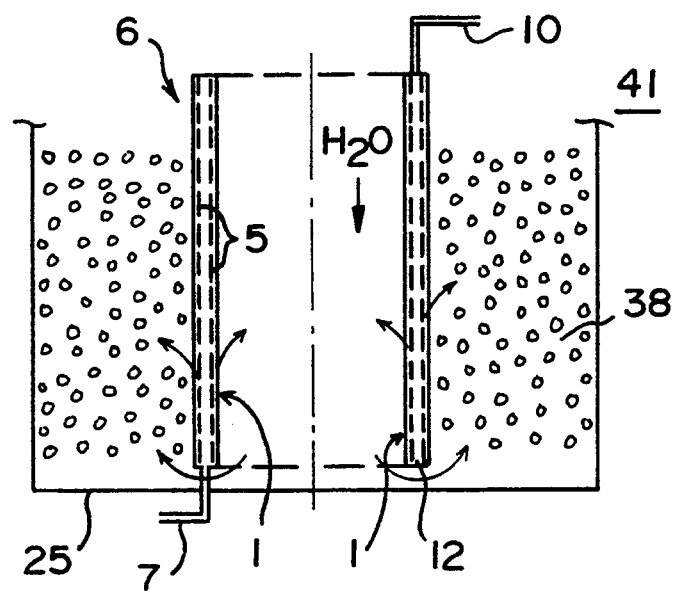
FIG. 6, a reactor with a double-walled tube membrane in a sectional side view.

FIG. 6 shows a reactor 41 in which a gas exchanger 6, consisting of two tube membranes 1 according to FIGS. 1 and 2 is inserted, a gas exchanger which is designed as a circular chamber 12. The inner wall and the outer wall 5 each are designed as gas-permeable tube membrane 1 with hollow cylinder 2. Thus, in this gas exchanger 6, two tube membranes are used in an assembly having one of the tube membranes located coaxially within the other. As membrane a silicone hose each is used which lies on hollow cylinder 2 and which comprises the above described fabric reinforcement 22 with silicone layer. Gas to be introduced in reactor 41 is introduced by gas supply pipe 7 into circular chamber 12. Water flows through gas exchanger 6 from the top down, flows out at the bottom and is redirected upward and, in doing so, flows through a fluidized bed 38. Gas gets into the water flowing through gas exchanger 6 by inner tube membrane 1. Gas is introduced in the water in the area of fluidized bed 38 by outer tube membrane 1. Excess gas is discharged from gas exchanger 6 by gas discharge pipe 10.

Figure 7:
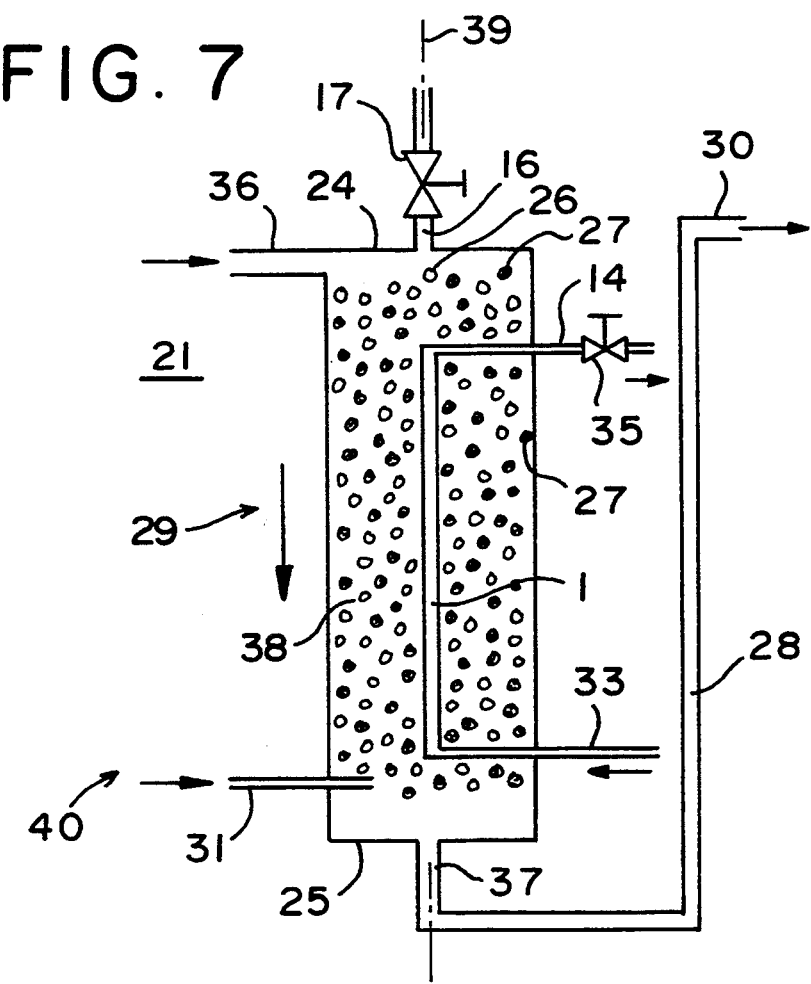
FIG. 7, a reactor with a tube membrane in a side view.

FIG. 7 shows another embodiment of a reactor 21, which is made by the downpipe 29, drain 37 and rising pipe 28 which form a U-shaped tube arrangement 40. Reactor 21 on reactor top 24 comprises a feed 36 for water and a gas discharge connecting piece 16 with a valve 17. On reactor bottom 25, drain 37 for gas-enriched water is provided to which rising pipe 28 is connected with water drain 30. Above reactor bottom 25 a gas feed pipe 31 is introduced in reactor 21. In reactor 21 there is a tube membrane 1 which is aligned parallel to reactor longitudinal axis 39. Several tube membranes 1 can also be placed in reactor 21. Tube membrane 1 is connected to a gas feed pipe 33 and a gas discharge pipe 14 with valve 35. Further a fluidized bed 38 made of small solid particles 27 is formed in reactor 21.

Reactor 21 is flowed through by water, downward from above, which enters by top side feed 36 and leaves by bottom side drain 37. Rising pipe 28 connected with the latter ends on or slightly above the intake level. In reactor 21 particles 27 are free floating and movable in the water stream. Between particles 27 there are gas bubbles 26 which are formed by gas feed pipe 31 in the lower part of reactor 1 during the blowing-in.

To remove undesired gases or gaseous volatile components, gas can be fed in excess to the water and rising gas bubbles concentrated in the water can be removed.

On the surface of particles 27 microorganisms or catalysts can be present, which perform biological and/or physiochemical reactions with substances contained in the water with consumption and utilization of the fed gases.

The productivity of reactor 21 for the performance of the process for enriching water with gas is made clear by the following examples.

EXAMPLE 1

In a reactor 21 with the following dimensions:
inner diameter, 0.12 m
height, 3 m
particle diameter, about 6 mm
amount of particles, about 12 l
particle material plastic granular material of styrene polymer or styrene copolymer styropor, it was possible to increase the oxygen concentration from 4 g of $O_2/m^3$ to 30 g of $O_2/m^3$ at a water throughput rate of between 4 and 8 $m^3/h$ by blowing in oxygen.

EXAMPLE 2

While operating a test unit a nitrifying biofilm with a conversion performance of 30 mg of $N/m^2$ h was formed on the surface of particles 27 used with an average diameter of 1.8 mm, when fed water containing ammonium. Correspondingly it was possible to achieve an output of 1.5 kg of $N/m^3 \times$ day relative to the reactor volume.

I claim:

1. Membrane assembly of a generally cylindrical configuration, for gas exchange in a liquid for working of biotechnological processes, comprising a dimensionally stable, hollow cylinder having a cylindrical wall with perforations and a tubular silicone membrane having an annular wall wherein the dimensionally stable, hollow cylinder is mounted within the annular wall of the tubular silicone membrane with the annular wall of the tubular silicone membrane covering said perforations, and wherein the annular wall of said silicone membrane is surrounded by a mechanical fabric reinforcement which is in overlying relationship thereto.

2. Membrane assembly according to claim 1, wherein the perforated dimensionally stable hollow cylinder is made of plastic.

3. Membrane assembly according to claim 1, wherein the perforated dimensionally stable hollow cylinder is made of metal.

4. Membrane assembly according to claim 1, wherein the tubular silicone membrane is formed of a gas-permeable silicone hose and wherein said mechanical fabric reinforcement is surrounded by an overlying silicone rubber layer.

5. Membrane assembly according to claim 4, wherein said silicone rubber layer is in the form of a silicone membrane.

6. Membrane assembly perforated, dimensionally stable according to claim 4, wherein a gas permeable spacer is located between an outside surface of the hollow cylinder and the gas permeable silicone hose.

7. Membrane assembly according to claim 1 wherein said silicone membrane comprises a fabric-reinforced, flat silicone membrane which is coiled around said cylindrical wall of the dimensionally stable, hollow cylinder to form said annular wall, said mechanical fabric reinforcement covering the annular wall formed of the fabric-reinforced, flat silicone membrane and having a silicone rubber layer disposed thereon.

* * * * *